Patented Dec. 30, 1930

1,786,510

UNITED STATES PATENT OFFICE

HERBERT A. SWENSSON, OF ROSE CREEK, MINNESOTA

COMBINATION HARROW AND SCRAPER

Application filed March 27, 1929. Serial No. 350,318.

This invention relates to improvements in a combination harrow and scraper and has for one of its principal objects the provision of means for combining two implements, each of unquestionable utility in one machine.

One of the important objects of the invention is to provide a ready means, in a combination scraper and harrow, for changing over from one device to another and vice versa, said means comprising a transverse pivotal mounting for both the harrow and scraper elements.

Another important object of the invention is the provision, in a combination harrow and scraper of an extremely simple light weight structure of both durable and rugged characteristics.

Other and further important objects of the invention will be apparent from the disclosures in the accompanying drawings and following specification.

The invention, in a preferred form, is illustrated in the drawings and hereinafter more fully described.

Figure 1:
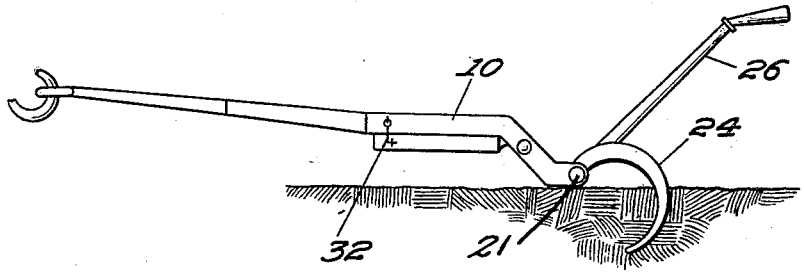
Figure 1 is a side elevation of the combination harrow and scraper, illustrating the device in its harrow position.
Figure 2:
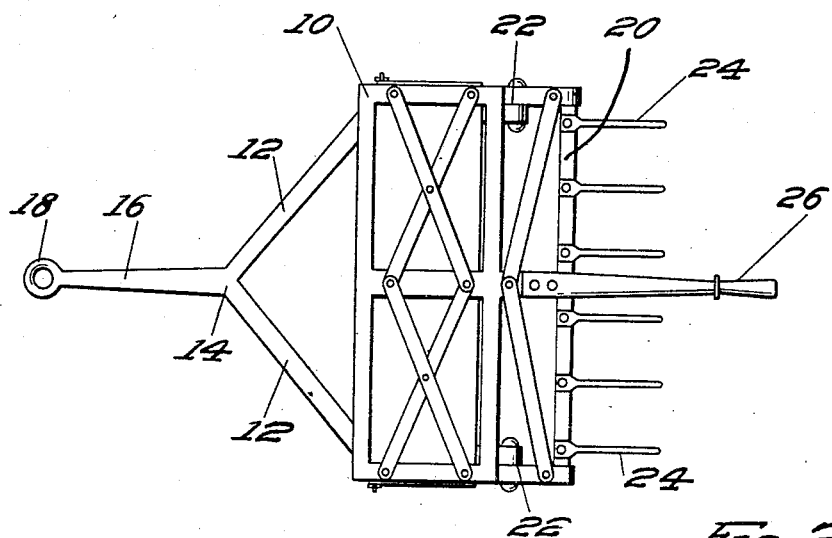
Figure 2 is a top plan view of the invention showing the harrow construction.
Figure 3:
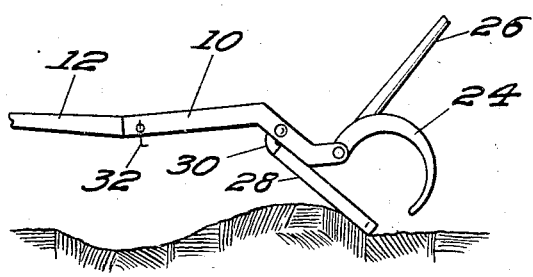
Figure 3 is a fragmentary side elevation of the device, illustrating the same in its scraper position.

The reference numeral 10 indicates generally the main frame of the combination device of this invention. Integrally attached to one end of the frame 10 and extending angularly therefrom is a pair of arms 12 which join at the point 14 and continue outwardly therefrom at right-angles to the frame 10 forming a shaft or the like 16. The outer end of the shaft comprises an integral ring 18 to which a team of horses or a tractor can be attached.

Pivotally mounted upon the rear portion of the frame 10 is a harrow frame 20, the pivotal connection comprising a pair of bearings 21 rigidly mounted upon the frame 10 one at each rear corner thereof. Rigidly positioned at equally spaced intervals on the harrow frame 20 and at right-angles thereto is a plurality of harrow blades 24. Rigidly mounted also upon the harrow frame 20 and adapted to move the frame and the blades 24 into and out of operative position with respect to the ground is a handle 26. This handle is also used for manually controlling the depth at which the blades 24 operate.

Pivotally mounted at the bearings 22 and adapted to swing in the same plane as the harrow frame 20 is a scraper 28. The pivotal connection of the scraper comprises a right-angle arm 30 which permits the scraper, to occupy a position in a plane parallel to the harrow frame when the device is used as a scraper, the harrow frame being then carried by the upper portion of the scraper and providing a desirable weighting effect thereon.

When the device is used as a harrow the scraper member 28 can be swung upwardly and fastened immediately under the main frame 10 by means of hooks 32 or the like, as shown best in Figure 1.

It is apparent that herein is provided a combination device which is extremely flexible of use, a device which can be manufactured economically and is certain to find a ready market. Further, the device is simple to operate and reduces the labor of the operator to a minimum.

I am aware that many changes may be made and numerous details of construction varied through out a wide range without departing from the principles of this invention, and I therefore do not purpose limiting the patent granted hereon otherwise than as necessitated by the prior art.

I claim as my invention:

In a combination harrow and scraper, a main frame, and means pivotally connected to the frame for alternately harrowing and scraping the ground as desired, said harrowing means comprising a harrow frame, a plurality of harrow blades mounted on the harrow frame and an operating handle therefor, and a scraper element also pivotally mounted upon the frame, and means for positioning the scraper element operatively or inoperatively with respect to the ground, said means including a latch mounted upon the harrow frame, said scraper frame also including means for holding the harrow blades in inoperative position when the scraper element is in operative position, said means comprising a right-angled pivotal connection between the harrow frame and the scraper element, and an offset in the frame for conducting the scraper and holding the harrow blades raised in inoperative position when the scraper is in operative position.

In testimony whereof I affix my signature.

HERBERT A. SWENSSON.